May 2, 1939.                H. A. HUSTED                2,156,476
                       TWO-PIECE HUB CONSTRUCTION
                         Filed Aug. 20, 1936            2 Sheets-Sheet 1

INVENTOR.
HARRY A. HUSTED
BY
ATTORNEY.

May 2, 1939. H. A. HUSTED 2,156,476
TWO-PIECE HUB CONSTRUCTION
Filed Aug. 20, 1936 2 Sheets-Sheet 2

INVENTOR.
HARRY A. HUSTED,
BY John Harrow Leonard,
his ATTORNEY.

Patented May 2, 1939

2,156,476

UNITED STATES PATENT OFFICE 2,156,476

TWO-PIECE HUB CONSTRUCTION

Harry A. Husted, St. Clair, Mich., assignor, by mesne assignments, to Thermo-Plastics, Incorporated, St. Clair, Mich., a corporation of Michigan Application August 20, 1936, Serial No. 97,038

5 Claims. (Cl. 74—552)

This invention relates to an improvement in an automobile steering wheel of the general type disclosed in my co-pending application, Serial No. 52,158, filed November 29, 1935, and more specifically is directed to an improved two-piece hub construction therefor.

In prior steering wheels having two-piece hubs, the spokes where held to the hub only by the friction existing between two hub members and the wire spokes. I have found by numerous tests that this method of mounting the spokes in the hub is unsatisfactory because the spokes may be pulled from the hub when sudden stresses are applied to the rim such as during an accident or emergency. Furthermore, in such wheels certain of the spokes invariably remain loose in the hub with resultant vibration and noise.

In my present construction the spokes and hub are capable of withstanding heavy stresses without breaking loose from each other, thus providing a more durable and rigid steering wheel.

The present hub is constructed in two pieces each piece having surfaces and shoulders which engage and cooperate with each of the wire spoke members to positively anchor the spoke members to the hub when the two hub pieces are assembled.

Since the steering wheel of the so-called "banjo" type has become popular, many such wheels, having a similar outward appearance, have been produced. These wheels, however, have not been of the proper construction to compare favorably with other designs in cost and strength.

It is an object of the present invention to provide a steering wheel of this type which, in appearance, exceeds such prior wheels and yet may be manufactured more economically.

Other objects include facility of assembly, greater rigidity and strength of the wheel, and the assurance of uniformly polished spoke members and hub which latter greatly improves the appearance.

Further objects may become apparent from the following description and accompanying drawings.

Figure 1:
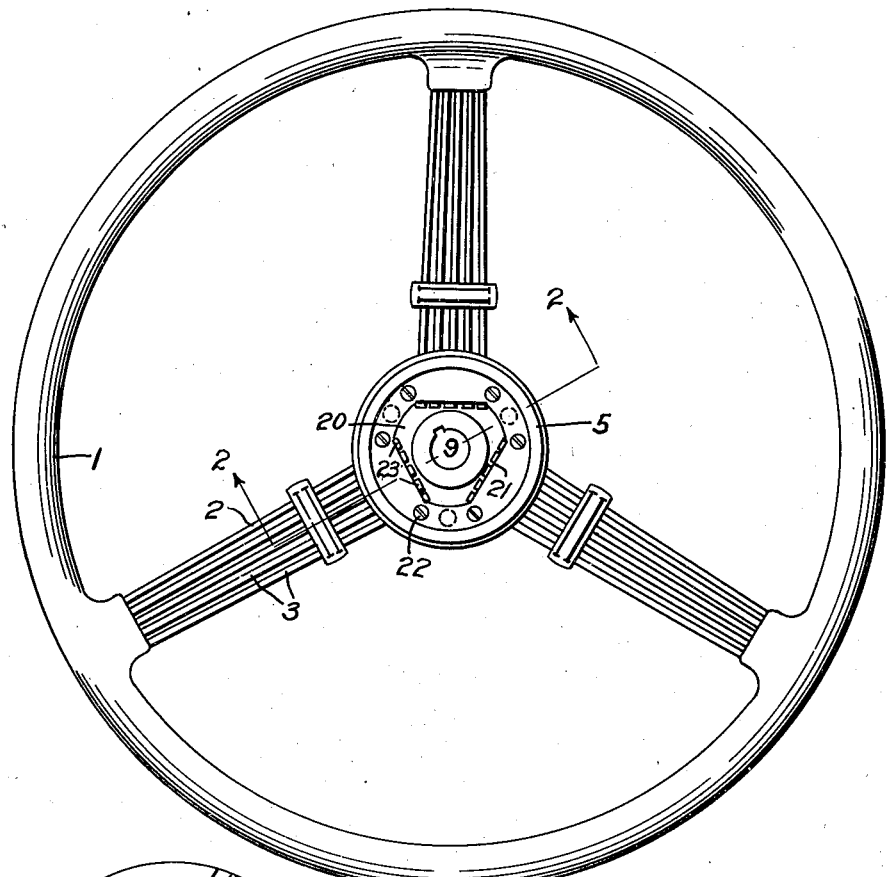
Fig. 1 is a plan view of a stering wheel employing a hub of the present invention.

Referring to the drawings, the parts comprising the steering wheel in general include a rim 1 having composite spokes 2 rigid therewith and consisting of groups of spring wire spoke members 3 each of which are secured to and terminate in a hub member indicated at 5.

The details of construction are more specifically directed to the hub member 5 and the cooperation between the hub member and spoke members. The hub 5 comprises a hub body portion 7, preferably circular in shape and having a central tapered opening 9 forming in effect a sleeve to fit the end of a conventional steering column.

In elevation, the contour of the body portion 7 is defined by an upwardly flaring circumferential wall, so that the upper surface 10 of the body is somewhat greater in diameter than the base.

Figure 3:
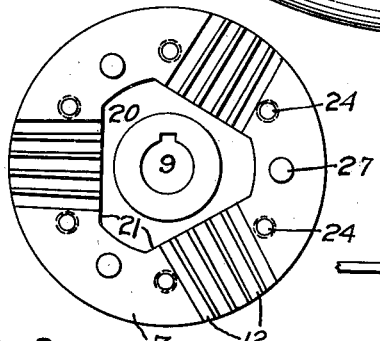
Fig. 3 is a plan view of the lower portion of the hub.

The surface 10 is provided with a number of substantially radially directed grooves 12, which may be V-shaped or semi-circular in cross-section or other desired shape for the purposes to be effected. These grooves are arranged in groups as illustrated in Fig. 3, each groove being adapted to accommodate one of the spoke members 3.

Figure 2:
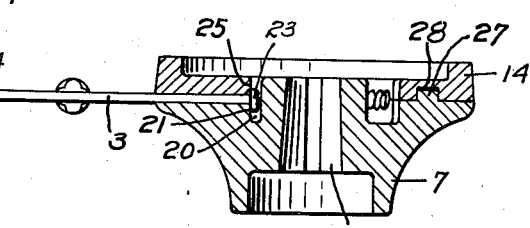
Fig. 2 is an enlarged sectional view through the hub taken along a plane indicated by the line 2—2 of Fig. 1.
Figure 4:
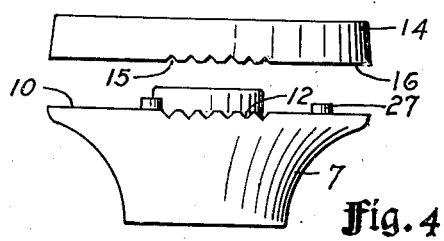
Fig. 4 is an elevation of the hub members in separated positions.
Figure 5:
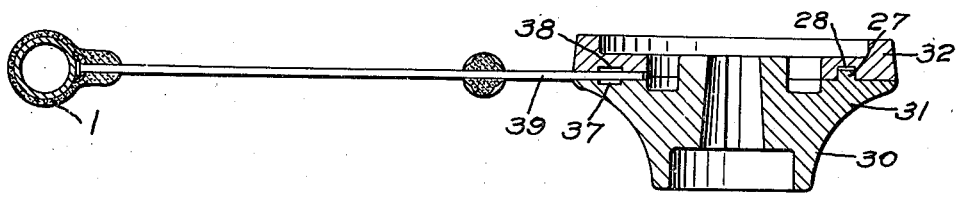
Fig. 5 is a sectional view through the rim, spokes and hub showing a modified form of the two-piece hub construction.

To secure each spoke member within its respective groove I provide a circular plate 14, which is superimposed upon the body portion 7. This plate 14 is preferably equal in diameter to the surface 10, and is also provided with a number of grooves 15 in the lower face 16 which register with corresponding grooves 12 when the portion 7 and plate 14 are assembled as shown in Fig. 2. Thus the inner end portion of each spoke member is embraced by the registering grooves 12 and 15.

This construction alone is not sufficient to insure positive anchoring of the spokes to the hub. The importance of rigidly securing each spoke member to the hub has been emphasized in the application referred to.

To eliminate the potential danger of breaking loose of the spokes from the hub in a steering wheel of the present design is a serious problem. Should any one of these spoke members break loose from the hub or rim during an accident a person who would otherwise escape harm might be seriously injured thereby.

To preclude the occurrence of such breaking of the spokes from the hub of a wheel of the present construction, I provide a simple arrangement for positively anchoring each spoke member to the hub, which will hereinafter be described.

In the surface 10 of the body portion 7 is a recess 20 having substantially vertical outer walls 21 and generally arranged in the shape of a triangle, as shown in Figs. 1 and 3. The inner ends of each group of grooves 12 terminate at the associated wall 21 of the triangular-shaped recess 20. The walls 21 may be straight or arched, according to the degree of divergence of the spoke members 3 comprising each spoke 2. In either case, it is essential to use spoke members of a uniform length and therefore important that the walls 21 be a uniform distance from the inner periphery of the rim member 1 as measured along each corresponding spoke member 3.

To assemble the steering wheel shown, the spoke members 3 are provided at their inner ends with heads 23. The members 3 having been previously secured to the rim member as by means disclosed in my prior application, are placed each in the corresponding grooves 12 so that the heads 23 lie in the recess 20 and snugly against the associated walls 21 of the recess 20. The plate 14 is then superimposed upon the face 10 so that the grooves 15 and 12 register with each other and embrace the corresponding spoke members. In this position, screws 22 are placed in suitable openings through the plate 14 and engage threaded openings 24 in the portion 7.

The plate 14 has a central and substantially triangular shaped opening which is defined by vertical side walls as at 25 and which register with the wall 21 respectively. Thus the heads or enlarged portions 23 are engaged and secured by both the portion 7 and the plate 14.

The plate 14 may be keyed to the portion 7 as by lugs 27 on the portion 7 which engage recesses 28 in the plate 14, as shown in Fig. 2, to preclude any relative rotation between these parts and also to relieve the screws 22 from carrying shearing stresses.

Each spoke member 3, plate 14 and portion 7 are preferably polished before assembly so there are no dark spots or discolored areas as there are in the case of wheels having spokes which are cast in the hub member. It is particularly difficult and expensive, in wheels of the latter type, to polish the hub between each spoke member. Consequently, these portions of such wheels remain rough, black, and unattractive. Moreover, due to the simplicity of the parts of my present construction the assembling operation can be accomplished without marring the previously polished surfaces.

Figure 6:
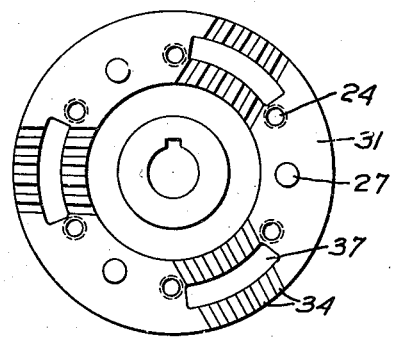
Figs. 6 and 7 are plan views of the lower and upper portions of the hub illustrated in Fig. 5.
Figure 7:
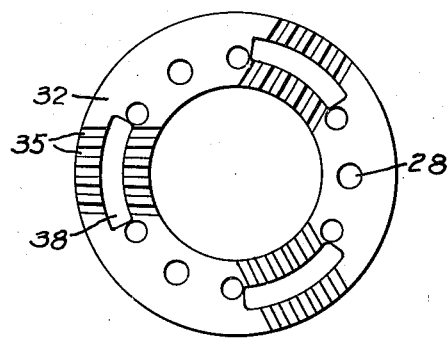

Referring now to Figs. 5 to 8 inclusive, a modified hub member 30 is shown comprising a body portion 31, corresponding to the portion 7, and a plate 32 corresponding to the plate 14 above. The engaging faces of the portion 31 and plate 32 are likewise provided with spoke receiving grooves 34 and 35 respectively which are directed substantially radially and are arranged in groups as shown in Figs. 6 and 7.

Extending transversely of the groups of grooves 34 and 35 are shallow relief areas 37 and 38 respectively which permit a much more effective gripping action on the spoke members when the pieces are assembled than is possible to obtain without such relief areas.

By this construction spoke members 39 are rigidly held in place within the hub solely by the frictional gripping effect of the grooves on the spokes. The bearing surfaces, however, which contact the spoke members are spaced longitudinally thereof and adjacent the inner and outer sides of the relief areas. Thus each wire spoke is assured of at least a two-point contact with the hub members which provides a very positive gripping and anchoring effect.

In prior two-piece hubs, where the grooves were continuous from the outer to the inner edge, many of the spokes were engaged by the hub at a single point due to the inherent inaccuracies and irregularities of the groove surfaces. Numerous strength tests made on such wheels demonstrated that these single point contacts are not sufficient to hold the spoke members tightly within the grooves when stresses are applied to the rim of the wheel.

Figure 8:
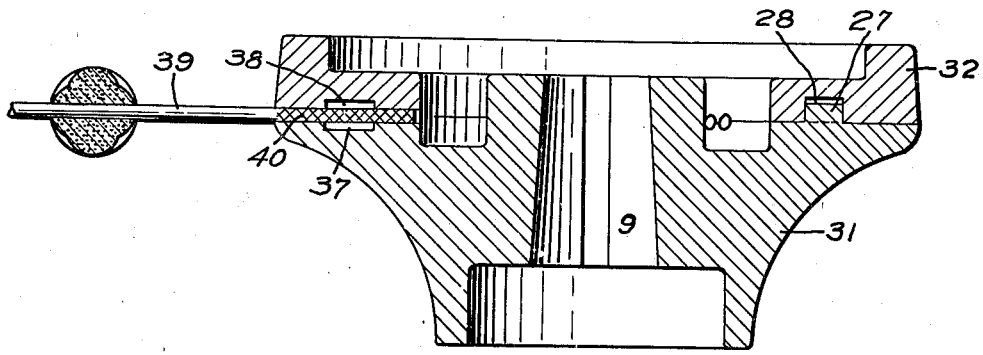
Fig. 8 is an enlarged fragmentary sectional view through the hub showing the hub pieces engaging a knurled portion on the spokes to obtain a rigid anchoring effect.

In Fig. 8 the spoke members 39 are shown provided with a knurled or roughened surface 40 which increases the efficiency of the gripping or anchoring effect of the spokes.

From the foregoing description it is apparent that my improved construction accomplishes all of the objects set forth and although I have shown and described but a few modifications I am aware that others may be made without departing from the spirit and scope of the present invention as defined in the hereunto annexed claims.

Having thus described my invention, what I claim is:

1. A steering wheel comprising a rim annulus, a plurality of groups of wire spoke members secured at their outer ends to said rim annulus, each wire spoke member having a head on its inner end, and a hub member comprising separable portions each having engaging faces, grooves in each of the engaging faces, said grooves individually embracing and gripping said wire spoke members, said portions having walls mutually and concurrently engaging each of said heads to positively anchor each wire spoke member to said hub and constrain the spoke members from radial dislocation when said separable portions are clamped and held together.

2. A steering wheel construction comprising a rim, a plurality of spokes, each spoke consisting of a number of wire spoke members rigidly attached to the rim, each spoke member having an enlarged head portion at one end thereof, a hub member including a body portion and a plate having mutually engageable surfaces, said surfaces having grooves for embracing each spoke member when the body portion and plate are secured together, walls in the body portion and plate engaging the head portion of each wire spoke member, retaining means for clamping said body portion and said plate together for anchoring each wire spoke member thereto, and interfitting means on the plate and body portion operative to lock the body portion and the plate against relative rotation when the body portion and plate are connected and to relieve the retaining means from carrying the stresses incident to forces tending to cause relative rotation of the body portion and plate.

3. In an automobile steering wheel, a hub comprising a body portion having a central axial opening for receiving and engaging a steering column, and a plate, said plate and said body portion having engaging surfaces, a plurality of grooves in the engaging surfaces of both the plate and body portion, the engaging surface of the body portion having a depression with walls extending transversely of said grooves, a plurality of wire spoke members each lying in its associated groove, each wire spoke member having an enlarged head portion lying partially in said depression, said plate having walls registering with said depression walls, the plate walls and the depression walls mutually and concurrently engaging the enlarged head portion of each wire spoke member when said body portion, plate and spoke members are in assembled relation and means for securing the plate to the body portion whereby to securely anchor each wire spoke member to the hub.

4. An automobile steering wheel construction comprising a rim annulus, a plurality of spokes each rigidly attached at its outermost end to said annulus and directed substantially radially inwardly thereof, a surface on each spoke near the innermost end thereof, said surface being disposed at an angle to the longitudinal direction of the associated spoke and facing generally toward the outer end thereof, a hub assembly including a body portion and a plate, said body portion and plate each having mutually engageable surfaces, radially extending grooves in said surfaces adapted to embrace the inner end portion of an associated spoke when the body portion and plate are secured together, shoulders on said body portion and said plate for concurrently engaging said surface of each spoke, and means associated with the body portion and plate to clamp the body portion and plate together.

5. An automobile steering wheel construction comprising a rim annulus, a plurality of spoke elements, said spoke elements being arranged in groups with the elements of each group in closely spaced relation to each other throughout their length, each spoke element being rigidly attached at its outermost end to said annulus and directed generally radially inwardly therefrom, each of said spoke elements having a surface near its innermost end, said surfaces being disposed at an angle to the longitudinal direction of the associated spoke element and facing generally toward the outer end thereof, said spoke elements being equal to each other in length between their points of connection with the rim annulus and said surface, a hub assembly having separable members including a body member and a plate member, said members being arranged to engage the inner end portions of the spoke elements of all the groups when the body member and plate member are secured together, shoulders on one of said members concurrently engageable with said surfaces of all of the spoke elements for constraining the spoke elements from outward radial displacement, and means associated with said members for securing the members together.

HARRY A. HUSTED.